Aug. 18, 1931.  J. J. STOETZEL  1,819,307
CARRIER INSERTING AND DISCHARGE DEVICE
FOR PNEUMATIC DISPATCH SYSTEMS
Filed Jan. 24, 1929  2 Sheets-Sheet 1
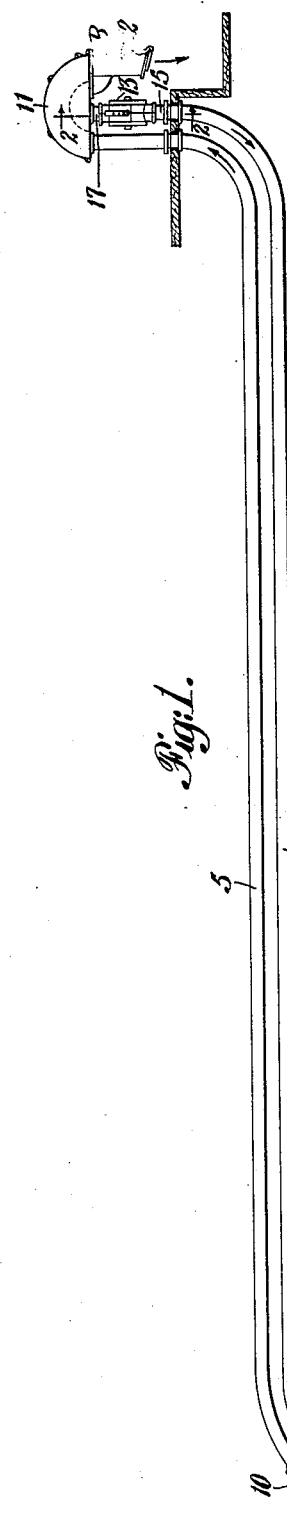
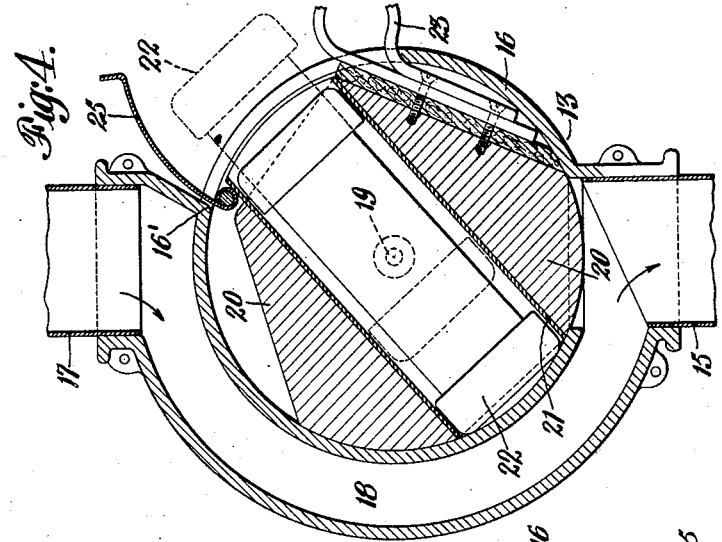
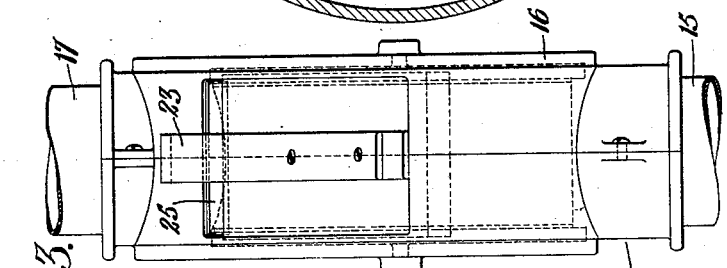
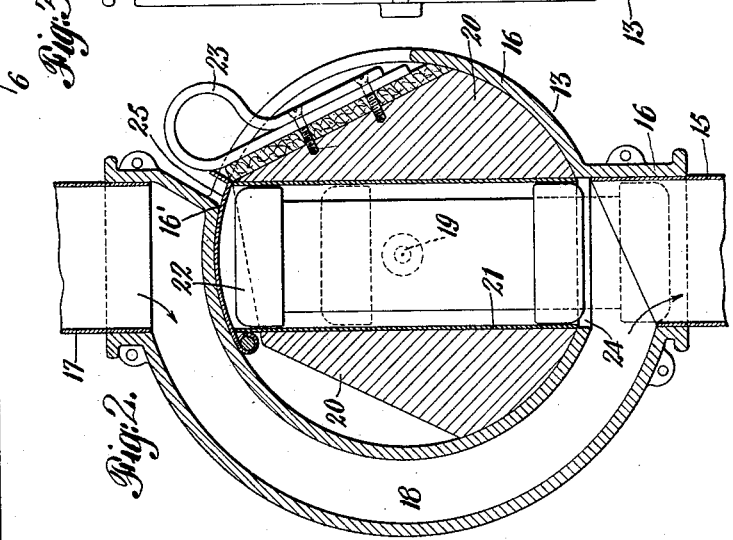
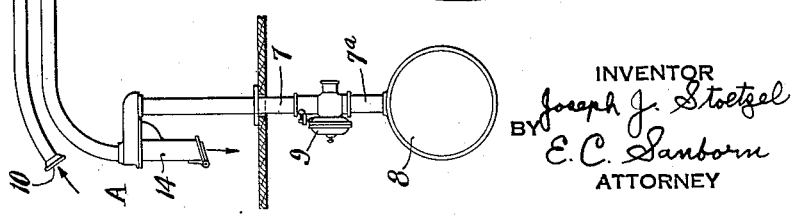
INVENTOR
Joseph J. Stoetzel
BY E. C. Sanborn
ATTORNEY

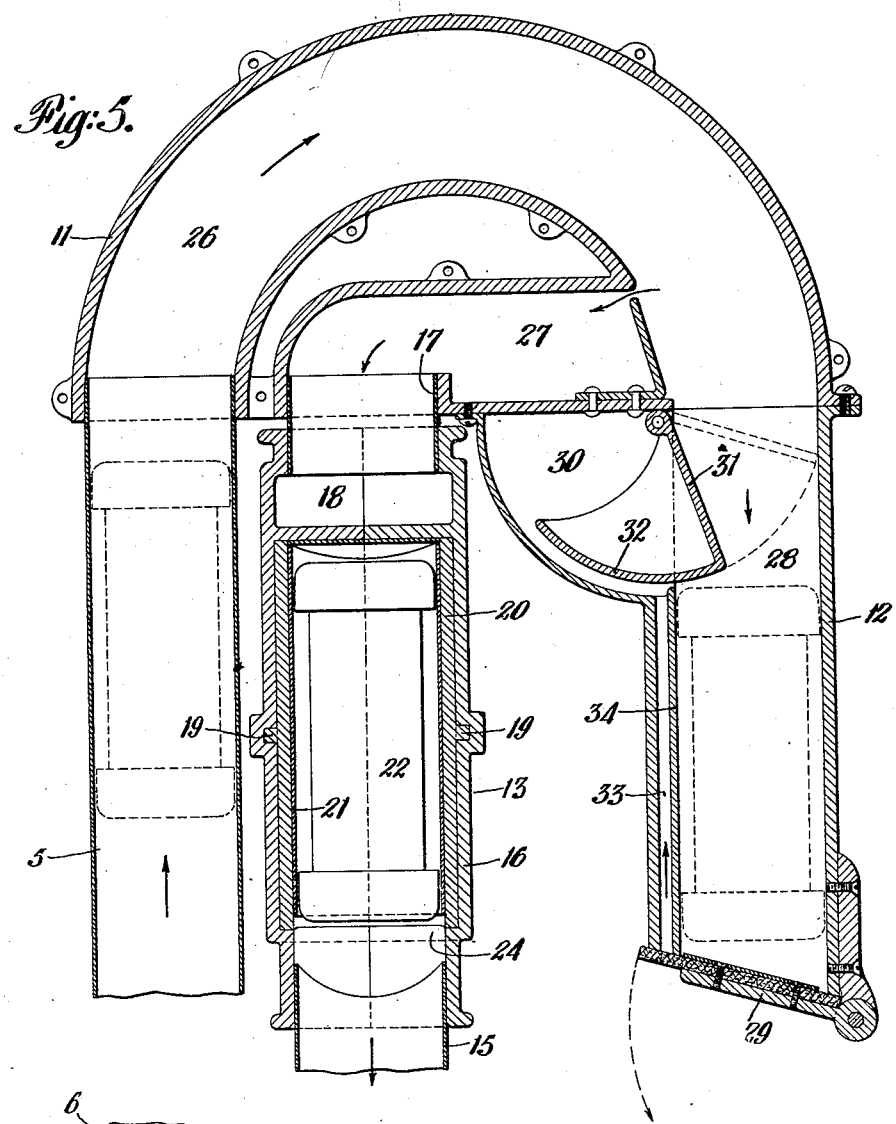
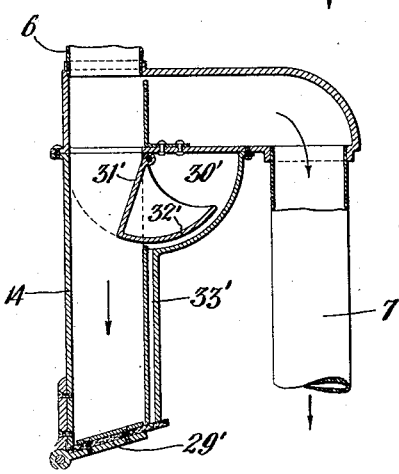

Patented Aug. 18, 1931

1,819,307

UNITED STATES PATENT OFFICE

JOSEPH JOHN STOETZEL, OF QUEENS VILLAGE, NEW YORK, ASSIGNOR TO G & G ATLAS SYSTEMS, INC., OF NEW YORK, N. Y., A CORPORATION OF NEW YORK

CARRIER INSERTING AND DISCHARGE DEVICE FOR PNEUMATIC DISPATCH SYSTEMS

Application filed January 24, 1929. Serial No. 334,655.

This invention relates to pneumatic dispatch systems. In pneumatic dispatch systems now in use, the insertion of a carrier into the line at an outlying or intermediate station involves opening the line, at said station, to the atmosphere; with consequent interruption of power and stoppage of other carriers. This becomes additionally objectionable, when, as frequently happens, there is delay in closing the door or closure member which was opened to permit insertion of the carrier; with the result that the power remains interrupted and the progress of other carriers is prevented as long as said door is open and the atmosphere thereby admitted to the line. Interference with the power such as above noted not only stops and delays carriers in transit, but is further undesirable in that if a carrier happens to be moving upwardly in a vertical portion of the line, the blocking of the power results in dropping of the carrier by gravity so that waste motion and increased delay in the movement of such carrier result.

Also, in the systems now in use, the withdrawal of carriers is accompanied by interruption of the power and delay in the transit of other carriers.

One of the objects of my invention is to provide means for inserting carriers into the transmission line without interfering with the power, so that the progress of other carriers may be uninterrupted. Thus, not only is the delivery of carriers in transit facilitated but the possibility of overloading due to an excessive number of carriers is lessened.

A further object resides in the provision of means whereby carriers may be withdrawn from the line without opening the latter to the atmosphere at the point of withdrawal; whereby interruption of the carrier propelling power, and consequent interference with the motion of other carriers, is avoided.

With these objects in view, my invention comprises a carrier inserting or dispatching device whereby a carrier may be placed in communication with the transmission line without, however, opening the line to the atmosphere. Also, I have devised a carrier delivery or discharging device which provides for the discharge of a carrier from the line, and at the same time prevents the entry of the atmosphere into the line at such point of discharge.

Other features of the invention will be hereinafter referred to.

In the accompanying drawings, wherein I have illustrated an embodiment of my invention:

Fig. 1 is a diagrammatic view of a single operating unit of a pneumatic dispatch system equipped with carrier dispatching and discharge devices embodying my invention.

Fig. 2 is a vertical cross-sectional view taken on line 2—2 of Fig. 1, and showing on an enlarged scale the carrier inserting or dispatching device in such position that the carrier is in communication with the transmission line.

Fig. 3 is an end elevation of the structure shown in Fig. 2.

Fig. 4 is a view similar to Fig. 2 but showing the carrier dispatching device shifted to position for receiving a carrier from the clerk.

Fig. 5 is a view in vertical longitudinal section, on a scale larger than that of Fig. 1, showing a portion of the transmission line at the outlying station in combination not only with the carrier dispatching device of Figs. 2–4 but also with means whereby a carrier may be discharged without opening the line to the atmosphere.

Fig. 6 is a fragmentary view in vertical longitudinal section and on a scale larger than that of Fig. 1, showing the transmission line at the central or terminal station provided with a carrier discharge device whereby a carrier may be withdrawn without admitting the atmosphere to the line at said point of withdrawal.

Referring to the drawings for a more detailed description of the invention, in Fig. 1 there is shown a transmission line unit of a pneumatic dispatch system which includes a station A (commonly known as the central or terminal station) and a station B (commonly designated as an outlying or intermediate station). Connecting said stations are a transmission tube 5 through which carriers are transmitted from station A to station B and a transmission tube 6 through which carriers are transmitted from station B to station A. The terminal portion 7 of transmission tube 6 is connected through a conduit 7a with a source of suction or exhaust 8. At 9 there is indicated a valve device for controlling the flow of air through the line, as is well known in the art.

The transmission tube 5 is provided at station A with an open bell mouth end 10 into which carriers may be inserted for dispatch to station B. At station B a hoodlike member 11 is provided and is connected to the tubes 5 and 6, said member and tubes being in communication with each other so that suction applied to the terminal portion 7 of the tube 6 results in the flow of air through both tubes 5 and 6; the air entering tube 5 at bell mouth 10 for eventual delivery into suction drum 8.

Carriers inserted into tube 5 at station A are discharged at station B through hood member 11, and I have shown the latter provided with my improved carrier discharge device indicated generally by reference numeral 12. Transmission tube 6 is shown provided at station B with my improved carrier inserting or dispatching device designated generally as 13, through which carriers may be inserted into said tube for delivery to station A. At the latter station I have shown tube 6 connected to a carrier discharge device 14 similar to discharge member 12.

Prior to my invention the insertion of a carrier into tube 6 at station B has necessitated the opening of the line to the atmosphere. For inserting a carrier into the line at said station B, a hinged closure member has been provided; such member being swung open when it is desired to insert a carrier into tube 6, and at the same time opening said tube to the atmosphere. It will be readily apparent that such admission of the atmosphere into said tube nullifies the power in tube 5 and that consequently any carriers that are at that time in transit from station A to station B are stopped until the line is again closed to the atmosphere at station B.

Through the carrier dispatching device 13 which I have devised, a carrier may be inserted into the line at station B without opening the line to the atmosphere. Such device is shown in detail in Figs. 2–4, and may be constructed substantially as follows:

Extending between the hood member 11 and the terminal portion 15 of tube 6 is a coupling member 16. Said terminal portion 15 of tube 6 is received in the lower end of said coupling member, while into the upper end thereof there projects a sleeve 17 which fits into an aperture in hood member 11. A curved passage 18 extends through said member 16 from sleeve 17 to sleeve 15.

Pivotally mounted on trunnions 19 in member 16 is a rockable carrier dispatching member or cradle 20 having therein a sleeve 21 for receiving a carrier 22. A handle 23 is secured to said cradle member whereby the latter may be conveniently rocked to the desired positions. When the member 20 is in its closed position, as shown in Fig. 2, the sleeve 21 therein is in communication with the terminal portion 15 of tube 6, so that carrier 22 may be dispatched into said tube. It may be noted in this connection that the coupling member 16 is provided with an aperture 24 above and in line with the portion 15 of tube 6 aforesaid, through which aperture the carrier travels into said tube. A lid 25 is hinged to member 20 adjacent the sleeve 21 and covers the upper end of said sleeve when said member 20 is in the position shown in Fig. 2, whereby the entry of the atmosphere into said sleeve is prevented.

Upon swinging the cradle member 20 into the position shown in Fig. 4, the lid 25 may be opened and a carrier thereupon inserted into sleeve 21. At this time, as will be clearly seen in Fig. 4, a solid portion of the member 20 covers the opening 24 in member 16, so that the line is closed to the atmosphere at station B notwithstanding the fact that a carrier may now be inserted for dispatch from that station. After inserting a carrier into sleeve 21 of the cradle member 20 and then restoring the parts to the position shown in Fig. 2, the carrier drops through aperture 24 into tube 6 and thence passes to station A. It will be seen that the by-pass 18 provides constant communication between hood member 11 and tube 6 regardless of the position of cradle member 20. Thus provision is made for a continuous flow of air through tube 5, the passages 26 and 27 (Fig. 5) of hood 11, sleeve 17, by-pass 18, and tube 6 to the source of suction 8, irrespective of the position of the carrier dispatching cradle 20. The lid 25 may be closed manually by the clerk immediately after inserting a carrier into member 20, but such is unnecessary since if said lid is not so closed it will be closed automatically by the upper portion 16' of the stationary coupling member 16 during the rocking of member 20 from its position in Fig. 4 to its Fig. 2 position. If desired said lid may be normally biased by spring means to open position.

From the foregoing description it will be evident that a carrier may be expeditiously inserted into the line at station B without interrupting the flow of air through the system, and thus without delaying the travel of any other carriers in transit.

In order that a carrier may be discharged without permitting air to enter the line through the discharge opening, I have shown in conjunction with station B a carrier discharge device comprising a casing 12 attached to and extending downwardly from the hood 11. This discharge device includes a tubular passage 28 in alignment with the channel 26 of hood 11, so that a carrier from station A, upon passing through said channel 26, drops into passage 28 aforesaid. The passage 28 is normally closed by a lid or cover 29, which cover is pivotally attached to the lower end of the casing 12, and may be normally biased to closed position by suitable spring means. The upper portion of said casing is offset to provide a chamber 30 in which is pivoted a gate or closure element 31. The latter has a rearwardly extending portion 32 curved concentrically with respect to the pivot of said element. Within the casing 12' and extending from the lower part thereof into communication with chamber 30, is a small passage-way 33, the inner wall or partition 34 of which projects slightly upwardly beyond said passage-way to a point contiguous to the curved extension 32 aforesaid. The operation of the foregoing structure may be briefly summarized as follows:

When the carrier emerges from the passage 26 of hood member 11 and drops downwardly in the tube or casing 12, the air below said carrier is compressed, cushioning the movement of the carrier, and as the latter nears the lid 29 said compressed air acts to open said lid slightly, admitting the atmosphere to the port or passage-way 33. The chamber 30 thus receives air at atmospheric pressure, which acts to move the closure 31 above the carrier to the dotted line position in Fig. 5, and thus during the withdrawal of the carrier from the casing 12 the passage of air through said casing and into the hood 11 is prevented and the travel of succeeding carriers is undisturbed. Thus, the opening of the lid 29 and withdrawal of the carrier from the discharge tube 12 do not interrupt the transit of other carriers. It may be noted that as the closure member 31 swings from its full-line to its dotted-line position in Fig. 5, the curved extension 32 thereof, in conjunction with the partition 34, blocks the escape of air from the chamber 30, whereby a substantially undiminished pressure on said closure member is maintained in said chamber.

In Fig. 6 I have shown (on a smaller scale than Fig. 5 but a larger scale than Fig. 1) a carrier discharge device 14 which may be employed at the central or terminal station A. This carrier discharge member is similar to that shown in Fig. 5 and comprises a tube or casing having a hinged cover 29', a chamber 30', a pivotally mounted gate or closure member 31' having a curved extension 32', and a passageway 33' extending from the lower part of casing 14 into comunication with chamber 30'. As a carrier drops into casing 14 and approaches the cover 29', the compressed air beneath said carrier opens said cover and admits air to passage 33', whereby closure 31' is actuated in the same manner as hereinbefore mentioned in connection with closure 31, thus preventing air from entering tube 6 through casing 14, and thereby avoiding interruption of the power during the discharge of the carrier from said casing.

It will be evident that the closure members 31 and 31' are readily movable into the respective chambers 30, 31' to permit the passage of carriers from hood 11 and tube 6 into the discharge casings 12, 14 respectively. It will also be apparent that, if desired, the carrier inserting or dispatching device 13 may be used independently of the carrier discharge devices here disclosed; it being evident that said inserting device is not dependent for its functioning upon the particular form of means employed for permitting discharge of carriers. Likewise, the carrier discharge devices here illustrated do not depend for their operation upon the particular form of carrier inserting or dispatching device. When, however, both carrier dispatching and discharge devices such as here shown are employed the progress of carriers in transit is not disturbed either by insertion or withdrawal of other carriers; and the propelling power is maintained uninterrupted regardless of whether carriers are dispatched or discharged.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. In a pneumatic dispatch system, a transmission line, means for causing movement of carriers inserted into said line, a member shiftable to a position for receiving in one end thereof a carrier for insertion into the line, means for shifting said member to a position wherein the carrier is inserted into the line through the opposite end of said member, and means whereby the line is maintained closed to the atmosphere at the place of insertion of the carrier regardless of the position of said member.

2. A carrier inserting device for pneumatic transmission lines comprising a member chambered to receive a carrier, means for shifting said member to a position for receiving a carrier and to another position for delivering the carrier to the line in combination with an element in which said member is mounted and provided with a by-pass providing constant communication between adjacent portions of a transmission line for permitting the flow of power for propelling the carrier, and means whereby the entrance of air to the line through the chamber in said member is prevented irrespective of the position of said member.

3. Carrier dispatching means comprising in combination a shiftable member having a carrier receiving chamber, and an element in which said member is movably mounted and having a conduit providing constant communication between adjacent portions of a pneumatic transmission line, said element also having an opening through which a carrier may pass from said chamber into said line, the construction and arrangement being such that when said member is shifted to a position for receiving a carrier a portion of said member overlies said opening whereby the passage of air into the line through the carrier receiving chamber is prevented.

4. Carrier dispatching means comprising in combination a shiftable member provided with a chamber having a carrier receiving end and a carrier discharging end, an element in which said member is movably mounted and having a conduit connecting adjacent portions of a pneumatic transmission line, said element also having an opening through which a carrier may pass from the discharging end of said chamber into said line, and means closing the carrier receiving end of said chamber when its carrier discharging end is in communication with said opening.

5. Carrier dispatching means comprising in combination an element having a conduit connecting adjacent portions of a pneumatic transmission line, a member pivotally mounted on trunnions in said element and provided with a chamber adapted to receive a carrier in one end thereof, means for shifting said member into position for discharging said carrier through the opposite end of said chamber into the transmission line, and means closing the carrier receiving end of said member when its discharge end is in communication with said line.

6. Carrier dispatching means comprising in combination a member chambered to receive a carrier, an element in which said member is movably mounted and provided with a by-pass connecting adjacent portions of a pneumatic transmission line for permitting the flow of power for propelling the carrier, means for shifting said member to a position for receiving a carrier and to another position for delivering the carrier to the action of power supplied through said by-pass, and means whereby the entrance of air to the line through the chamber in said member is prevented irrespective of the position of said member.

In testimony whereof, I have signed my name to this specification this 22nd day of January, 1929.

JOSEPH JOHN STOETZEL.